(12) United States Patent
Kusase

(10) Patent No.: US 6,680,557 B2
(45) Date of Patent: Jan. 20, 2004

(54) ROTARY ELECTRIC MACHINE HAVING CYLINDRICAL ROTOR WITH ALTERNATING MAGNETIC POLES THEREON

(75) Inventor: Shin Kusase, Obu (JP)

(73) Assignee: Denso Corporation, Kariya (JP)

( * ) Notice: Subject to any disclaimer, the term of this patent is extended or adjusted under 35 U.S.C. 154(b) by 40 days.

(21) Appl. No.: 10/171,637

(22) Filed: Jun. 17, 2002

(65) Prior Publication Data
US 2003/0076000 A1 Apr. 24, 2003

(30) Foreign Application Priority Data
Oct. 18, 2001 (JP) .................................. 2001-320806

(51) Int. Cl.⁷ .............................................. H02K 1/22
(52) U.S. Cl. ...................................... 310/263; 310/261
(58) Field of Search ............................... 310/261, 263, 310/257, 42; 29/596–598

(56) References Cited

U.S. PATENT DOCUMENTS 2,672,564 A * 3/1954 Krasno ......................... 310/46
3,663,846 A * 5/1972 Wagner et al. ............... 310/164
4,513,216 A * 4/1985 Muller ..................... 310/156.68

FOREIGN PATENT DOCUMENTS

DE     4213379 A1 * 10/1993 .................. 310/263

* cited by examiner

Primary Examiner—Tran Nguyen
(74) Attorney, Agent, or Firm—Oliff & Berridge, PLC

(57) ABSTRACT

A rotary electric machine for a vehicle has a rotor with a rotor shaft, a pair of rotor cores, a field winding and an annular core made of a stack of core sheets. The rotor core has a boss, a disc portion and a cylindrical part. The cylindrical part is connected with the disc portion and is continuous along the rotor shaft. The cylindrical part is formed with projections and recesses which are disposed alternately in a circumferential direction on the outer periphery thereof. Permanent magnets may be disposed in the recesses. The annular core is connected with outer peripheries of the projections of the cylindrical parts. By adopting the cylindrical parts and the annular core, diameter of the boss is enlarged.

9 Claims, 5 Drawing Sheets

ROTARY ELECTRIC MACHINE HAVING CYLINDRICAL ROTOR WITH ALTERNATING MAGNETIC POLES THEREON

CROSS REFERENCE TO RELATED APPLICATION

This application is based on and incorporates herein by reference Japanese Patent Application No. 2001-320806 filed Oct. 18, 2001.

FIELD OF THE INVENTION

The present invention relates to a rotary electric machine used as motors or power generators in vehicles, aircraft, industrial tools and the like where compactness and high efficiency are highly required.

BACKGROUND OF THE INVENTION

Motors and generators as rotary electric machine used in vehicles are greatly needed to be compact, light weight and high performance. Magnetic flux governs the performance of the motor and the generator. To attain compactness and increase of magnetic flux, a rotor having a Lundell-type magnetic field core is used. This core comprises a boss press-fit around a rotary shaft, disc portions extending from the boss and claw-shaped magnetic poles connected to the disc portions. In this core, magnetic flux is generated by a magnetic field winding which is wound in a simple centralized winding, and the magnetic flux is generated in parallel to magnetic circuits which are formed with respective claw-shaped magnetic poles. Thus, it realizes high magnetizing ampere-turns at respective claw-shaped magnetic poles.

However, when using the Lundell-type rotor, in case the rotor is determined to a certain diameter, a diameter of the boss governing quantity of magnetic flux is not able to be enlarged so much in order to acquire necessary radial thickness of claw-shaped magnetic poles and quantity of the magnetic field winding. As a result, the magnetic flux easily saturates in the boss, thereby limiting improvement of the output. In addition, as the magnetic field core comprising claw-shaped magnetic poles is a mass as a whole, eddy currents develop in the surface of the claw-shaped magnetic poles when the magnetic flux fluctuates. As a result, it experiences more magnetic pole losses than general layered magnetic poles.

SUMMARY OF THE INVENTION

It is therefore an object of the present invention to provide a rotary electric machine, which attains high performance and minimizes loss of magnetic flux.

According to the present invention, a rotary machine has a stator having an annular stator core which is wound with multi-phase windings and a rotor disposed radially inside the stator core to generate rotating magnetic fields. The rotor has a rotor shaft, a boss, disc portions, cylindrical parts and a magnetic field winding. The boss is press-fit around the rotor shaft. The disc portions extend radially from an outer periphery of the boss. The cylindrical parts are disposed radially outside the boss in connecting with the disc portions and are continuous in a circumferential direction. The magnetic field winding is disposed between the boss and the cylindrical parts. The rotor has a shape or structure to give a cyclic change of magneto-resistance corresponding to a cycle of an electric angle $2\pi$ of the multi-phase windings at the outer peripheries of the cylindrical parts. Hereby the cylindrical parts are used as magnetic poles instead of Lundell-type claw-shaped poles. Therefore, when centrifugal forces act on the rotor, tensile stresses to widen the whole cylindrical parts radially outward develop instead of immense bending moments which affect the claw-shaped poles formerly. Thus, the magnetic poles formed on the rotor are equipped with certain resistance to centrifugal forces.

In addition, the magnetic poles are able to be made thinner than the claw-shaped poles to carry the same quantity of magnetic flux as the claw-shaped poles do because the whole portions of the cylindrical parts lead the magnetic flux. Therefore, when the field winding is wound in the same condition, the diameter of the boss is enlarged, which results in increase of the quantity of magnetic flux passing through the boss which governs output performance eventually, and thus, performance of the rotary electric machine is improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE REFERRED EMBODIMENT

First Embodiment

Figure 1:
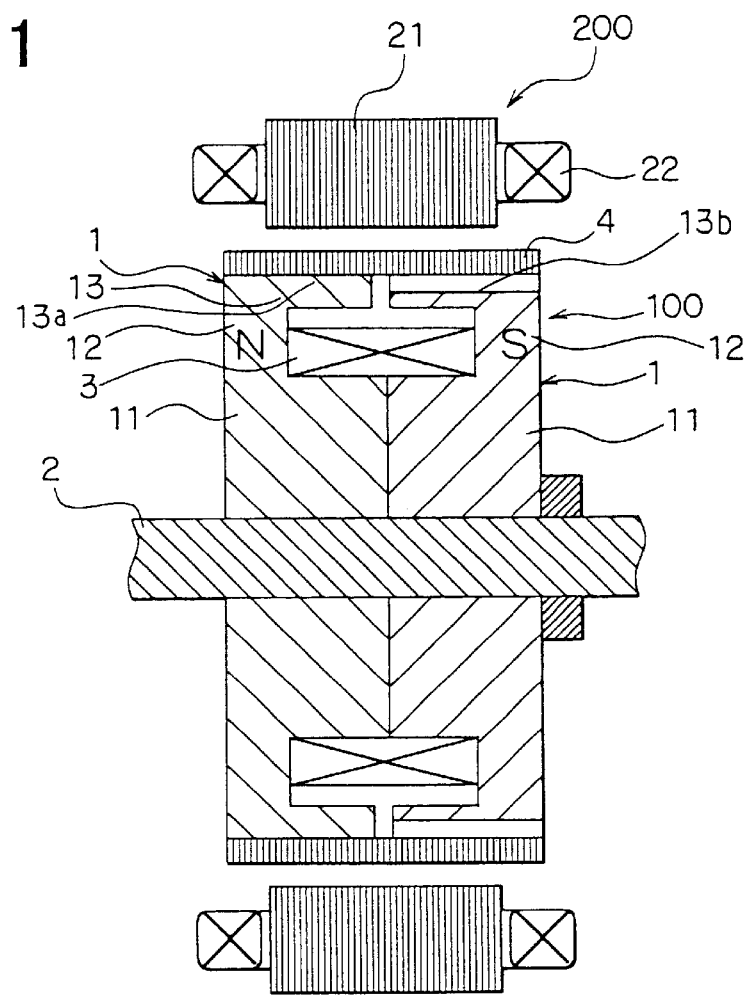
FIG. 1 is a sectional view of a part of an alternating current generator for a vehicle according to the first embodiment of the present invention, showing a rotor and a stator combined to the rotor.
Figure 2:
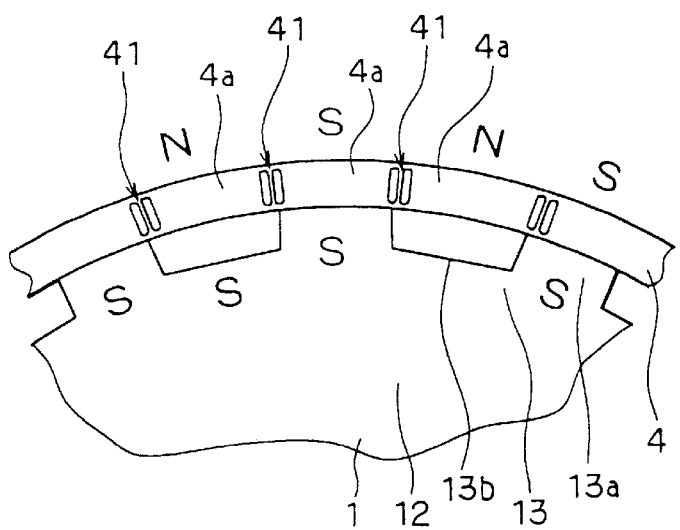
FIG. 2 is a partial cross-sectional view of the rotor shown in FIG. 1.

Referring first to FIG. 1, a stator 200 of an alternating current generator comprises a stator core 21 made of a stack of core sheets, multi-phase windings 22 and the like. The stator core 21 is formed with a plurality of slots (not shown), which opens radially inward. The multi-phase windings 22 are wound through the slots. The multi-phase windings 22 are, for instance, three-phase windings which consist of X, Y and Z phases.

A rotor 100 of the generator comprises a pair of rotor cores 1, a rotor shaft 2, a magnetic field winding 3, an annular core 4 made of a stack of core sheets and the like. The rotor core 1 has a cylindrical boss 11, a disc portion 12 and a cylindrical part 13. The boss 11 is press-fit around the rotor shaft 2. The disc portion 12 extends radially from an outer periphery of the boss 11. The cylindrical part 13 is connected with the disc portion 12 and extends continuously along the rotor shaft 2. The cylindrical part 13 is disposed radially outside the boss 11, and is continuous in a circumferential direction, surrounding the boss 11. The cylindrical part 13 has a plurality of projections 13a and recesses 13b, which are formed alternately in the circumferential direction in an outer periphery thereof. The cylindrical part 13, for instance, is 4 mm thick radially at the projections 13a and 2 mm thick radially at the recesses 13b. Thus, the difference in height between the outer peripheries of the projections 13a and the recesses 13b is 2 mm.

The rotor cores 1 are used in a pair. A pair of the rotor cores 1 are press-fit around the rotor shaft 2 which is inserted into the respective bosses 11 so that the circumferential positions of the projections 13a of one cylindrical part 13 and the recesses 13b of the other cylindrical part 13 pair up with each other. In addition, a pair of inner spaces surrounded by the respective bosses 11, disc portions 12 and cylindrical parts 13 face each other.

The magnetic field winding 3 is wound around the boss 11 of the rotor cores 1 and is supplied with electricity through slip rings (not shown) disposed on the rotor shaft 2.

The annular core 4 surrounds the outer peripheries of the rotor cores 1. Each sheet of the annular core 4, for instance, is 3 mm wide in the radial direction and is almost as thick as the sheet of the stator core 21 in the axial direction. The annular core 4 is disposed so that the inner periphery thereof is connected with the outer peripheries of the projections 13a of the cylindrical parts 13 of the rotor cores 1. The annular core 4 also is formed with slits 41 in the circumferential direction at an interval in which an electric angle of the multi-phase windings 22 cycles in π. The slits 41 are formed in pairs so that circumferentially neighboring magnetic polar regions 4a formed by the slits 41 are insulated magnetically.

The rotor 100 in this embodiment is constructed as the projections 13a of one cylindrical part 13 and the recesses 13b of the other cylindrical part 13 are disposed to couple with each other. The annular core 4, for instance as shown in FIG. 1, is joined to the projection 13a of one cylindrical part 13 of north pole and is magnetized into north pole in this cross section. Apart from this point to the circumferential direction by π in the electric angle, the annular core 4 is joined to the projection 13a of the other cylindrical part 13 of south pole and is magnetized into south pole in this cross section. Thus, magnetic polar regions 4a of north poles and magnetic polar regions 4a of south poles appear alternately on the annular core 4 in the same cycle as the projections 13a and recesses 13b are disposed alternately in the circumferential direction.

Magnetic field flux generated by supplying the field current to the field winding 3 passes through the projection 13a of the cylindrical part 13 of north pole and the north polar region 4a of the annular core 4, and is led to the stator core 21 by way of a clearance between the rotor 100 and the stator 200, and finally goes back to the south polar region 4a of the annular core 4 and the projection 13a of the cylindrical part 13 of south pole. By rotating the rotor 100 with such distribution of the magnetic field, an alternating voltage is induced in the multi-phase windings 22.

In case magnetic poles are conventional Lundell-type claw poles, for instance, when an outer diameter of a rotor is 105 mm, the claw poles are 13 mm thick, a distance between an inner periphery and an outer periphery of a magnetic field winding is 12 mm, a diameter of a boss is 55 mm and an amount of magnetic flux passing through the boss is 0.04 Wb. On the other hand, in the rotor 100 in this embodiment, the cylindrical part 13 and the annular core 4 are continuous membranously in circumferential direction forming a bowl-like shape respectively. Therefore, the edge of the cylindrical part 13 and the annular core 4 are free from extension caused by centrifugal force unlike the Ludell-type claw poles, and they need not have more than minimum thickness to achieve necessary strength. For instance, when total thickness of the projection 13a of the cylindrical part 13 and the annular core 4 is 7 mm, the total thickness is reduced by 6 mm. In this case, the diameter of the boss 11 is enlarged to 67 mm even when the magnetic field winding 3 is wound for the same times as in the Lundell-type claw poles to maintain 12 mm radial distance. As a result, magnetic flux passing through the boss 11 is increased by nearly one and half times to 0.06 Wb from 0.04 Wb as is shown in equation (1), and the output is also increased with the same ratio theoretically.

$$0.04\,[Wb] \times (67/55)^2 = 0.06\,[Wb] \tag{1}$$

Actually, the above effect is somewhat reduced because of saturation in magnetic circuits, but in this embodiment, the output is improved prominently by around 30 percent.

In addition, as the rotor cores 1 are disposed with the annular core 4 outside the outer peripheries thereof, development of eddy currents at the surface of the outer periphery of the annular core 4 is inhibited, and power generation efficiency is increased as much. For instance, magnetic flux loss at surfaces of magnetic poles is reduced from 100 W to ignorable levels for 2 kW output, thus, an improvement by 5 percent in power generation efficiency is observed.

Moreover, the slits 41 radially disposed in the annular core 4 minimize leaking of magnetic flux along the peripheral direction of the annular core 4, and thus, power generation efficiency is further improved.

Again, the projections 13a and recesses 13b may be formed in the inner periphery of the annular core 4 instead of the cylindrical parts 13 of the rotor core.

Second Embodiment

Figure 3:
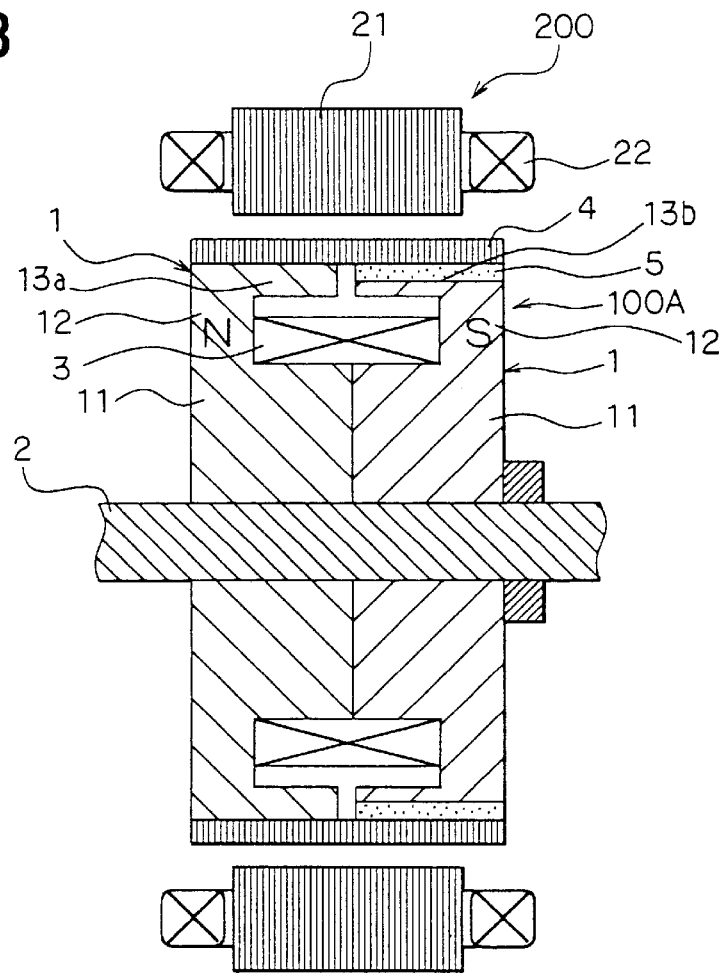
FIG. 3 is a sectional view of a part of an alternating current generator for a vehicle according to the second embodiment of the present invention, showing a rotor and a stator combined to the rotor.
Figure 4:
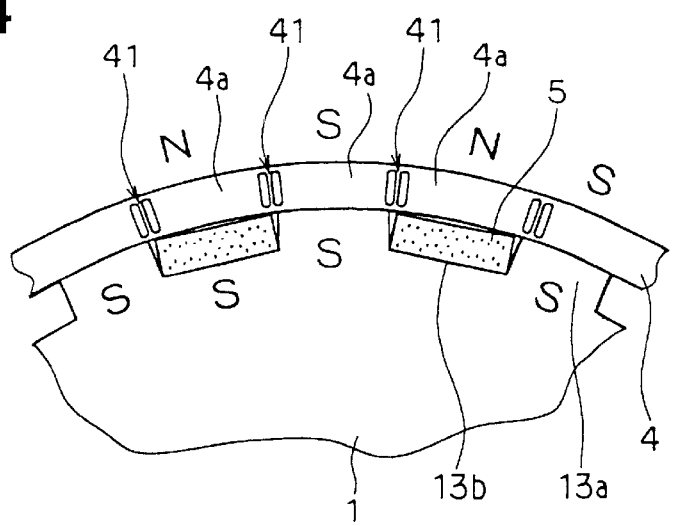
FIG. 4 is a partial cross-sectional view of the rotor shown in FIG. 3.

In the second embodiment shown in FIG. 3, a rotor 100A is used. The rotor 100A, differently to the rotor 100, has a plurality of permanent magnets 5 press-fit in the recesses 13b formed in the cylindrical part 13 of the rotor core 1. The permanent magnets 5 are magnetized in the radial direction so that the radially outer sides thereof are the same magnetic poles as the annular core 4 disposed in radially outside thereof. That is, as shown in FIG. 4, the permanent magnets 5 press-fit in the recesses 13b formed in one rotor core 1 which is south pole have north poles in the radially outer sides thereof, and south poles in the inner sides thereof. On the other hand, the permanent magnets 5 press-fit in the recesses 13b of the other rotor core 1 which is north pole have south poles in the radially outer sides thereof, and north poles in the radially inner sides thereof.

Thus, not only magnetic flux is prevented from leaking out of the recesses 13b, but also the permanent magnets 5 add magnetic flux to the annular core 4 adjacent to the radially outer sides thereof, and as a result, the output is increased. In addition, the permanent magnets 5 prevent development of eddy currents in the annular core 4. In the first embodiment shown in FIG. 1 without the permanent magnets, the magnetic flux passes through the annular core 4 in the axial direction. Therefore, fluctuating constituents of the magnetic flux overlap, and as a result, eddy currents develop in the faces of the core sheets. Differently to it in this embodiment shown in FIG. 3, the permanent magnets 5 prevent such magnetic flux constituents crossing the core sheets, and it results in an effect to improve the efficiency more.

Third Embodiment

In the third embodiment shown in FIGS. 5 to 8, a rotor 110 is used. The rotor 110 basically has the same construction as the rotor 100A in the second embodiment shown in FIG. 3 except that the annular core 4 disposed in connecting with the outer periphery of the rotor core 1 is omitted.

Figure 5:
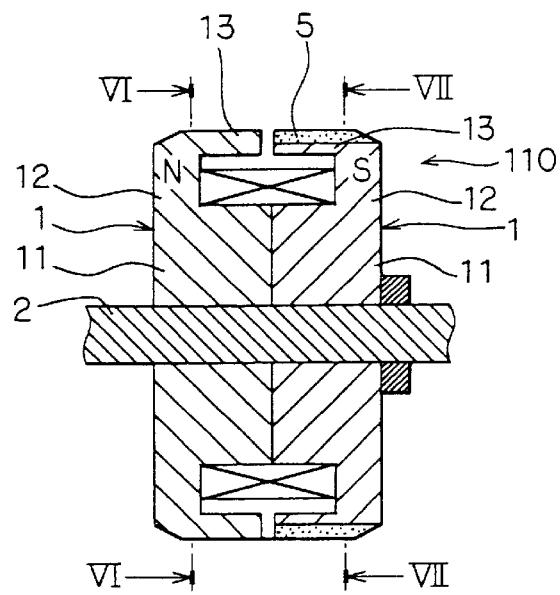
FIG. 5 is a sectional view of a part of an alternating current generator for a vehicle according to the third embodiment of the present invention, showing a rotor thereof.
Figure 6:
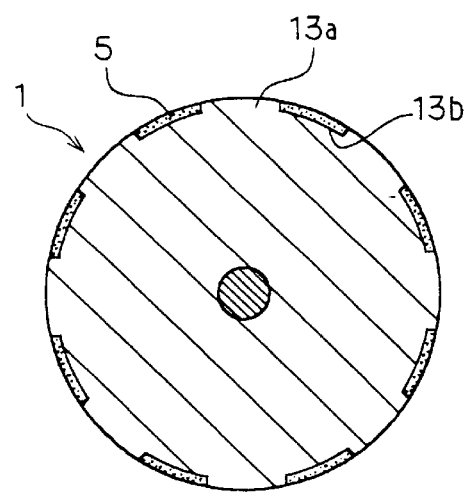
FIG. 6 is a cross-sectional view of the rotor of FIG. 5 as taken along the line VI—VI.
Figure 7:
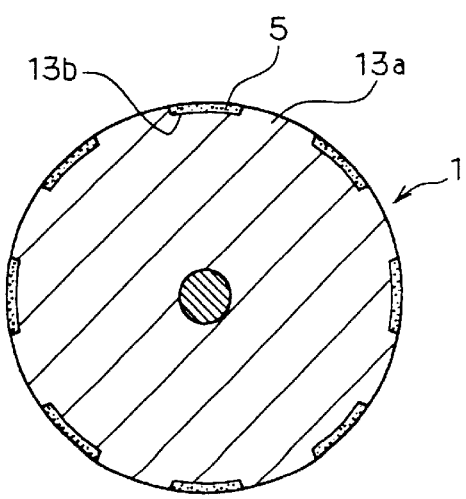
FIG. 7 is a cross-sectional view of the rotor of FIG. 5 as taken along the line VII—VII.
Figure 8:
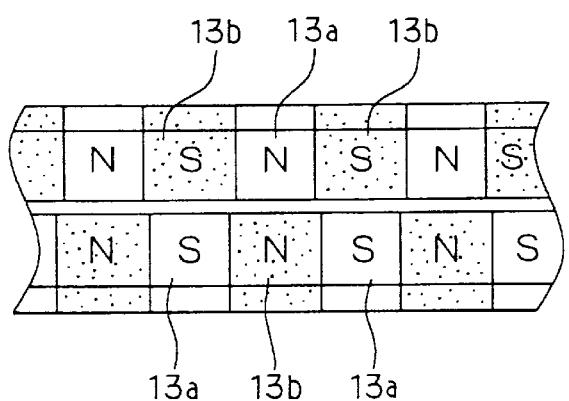
FIG. 8 is an exploded view of the outer periphery of the rotor shown in FIG. 5.

As shown in the second embodiment, in the cross section shown in FIG. 5, when one rotor core 1 which has the permanent magnets 5 press-fit thereon is magnetized into south pole and the permanent magnets 5 are disposed in the recesses 13b of the cylindrical part 13 of the rotor core 1 so that the radially inner sides of the magnets 5 are south poles and the radially outer sides are north poles, both the radially outer sides of the magnets 5 and the other rotor core 1 are north poles.

To the contrary, in the cross section of the other rotor core 1 which is magnetized into north pole where the permanent magnets 5 are press-fit in the recesses 13b of the cylindrical part 13 of the other rotor core 1 so that the radially inner sides of the magnets 5 are north poles and the radially outer sides are south poles, both the radially outer sides of the magnets 5 and the former rotor core 1 are south poles. Thus, on the outer periphery of the rotor 110, like the rotors 100 and 110A in the first and second embodiments, north poles and south poles are formed alternately in the circumferential direction. By rotating the rotor 110 disposed with these magnetic poles, alternating voltages are induced in the multi-phase windings of the stator.

Thus, in the rotor 110 in this embodiment, the cylindrical part 13 is continuous membranously in the circumferential direction forming a bowl-like shape. Therefore, its edge is free from extension caused by centrifugal force unlike the Lundell-type claw poles, and the cylindrical part 13 need not have more than minimum thickness to achieve necessary strength. Compared with the rotor 100A in the second embodiment, the rotor 110 experiences lowering of efficiency and lowering of resistance to centrifugal force since the annular core is omitted, but it offers advantages of conciseness and low cost.

Fourth Embodiment

In the fourth embodiment shown in FIGS. 9 to 12, a rotor 120 is used. The rotor 120 is disposed with a part of the permanent magnets radially outside the annular core differently to the rotor 100A in FIG. 3 which is disposed with the permanent magnets 5 inside the annular core 4.

Figure 9:
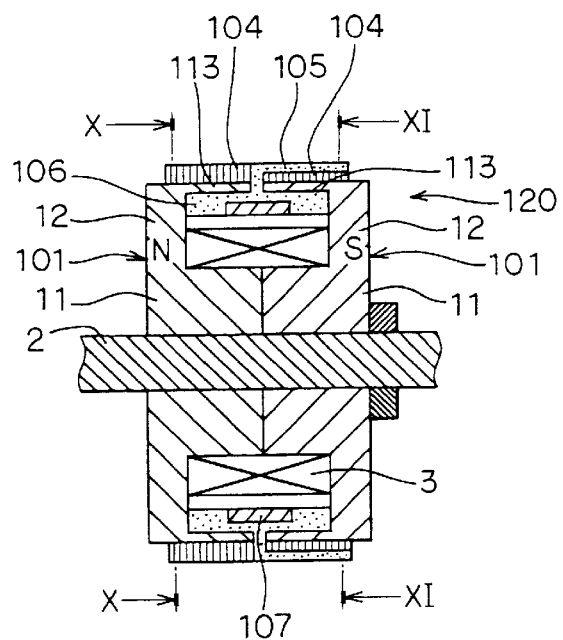
FIG. 9 is a sectional view of a part of an alternating current generator for a vehicle according to the fourth embodiment of the present invention, showing a rotor thereof.

The rotor 120 shown in FIG. 9 comprises a pair of rotor cores 101, the rotor shaft 2, the magnetic field winding 3, a pair of annular cores 104 made of a stack of core sheets, permanent magnets 105 and 106, a neutral polar yoke ring 107, and the like. In this embodiment, basically the same constructions as the rotors 100 and 100A in the first and second embodiments are marked likewise.

The rotor core 101 has the cylindrical boss 11, the disc portion 12 and a cylindrical part 113. The boss 11 is press-fit around the rotor shaft 2. The disc portion 12 extends radially from the outer periphery of the boss 11. The cylindrical part 113 is connected with the disc portion 12 and extends along the rotor shaft 2. The cylindrical part 113 is disposed radially outside the boss 11, and is continuous in a circumferential direction, surrounding the boss 11. The cylindrical part 113 has flat inner and outer peripheries, and the cylindrical shape thereof has the equal thickness in every portion. The rotor cores 101 are used in a pair. A pair of the rotor cores 101 are press-fit around the rotor shaft 2 which is inserted into the respective bosses 11 so that a pair of inner spaces surrounded by the respective bosses 11, disc portions 12 and cylindrical parts 113 face each other.

Figure 10:
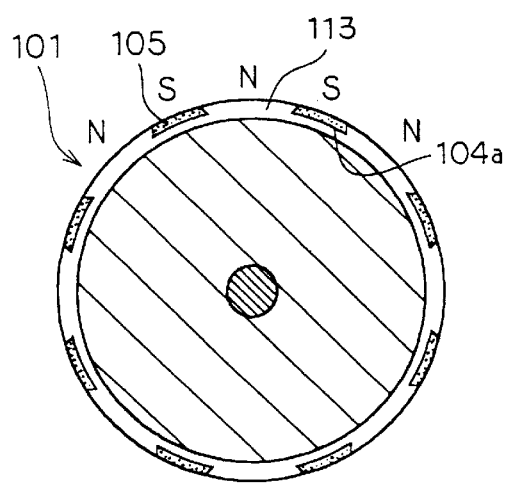
FIG. 10 is a cross-sectional view of the rotor of FIG. 9 as taken along the line X—X.
Figure 11:
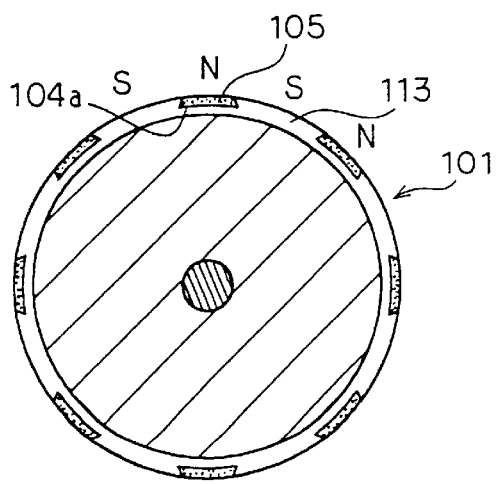
FIG. 11 is a cross-sectional view of the rotor of FIG. 9 as taken along the line XI—XI.

The annular core 104 is formed with a plurality of slots 104a in a circumferential direction in the outer periphery thereof. The slots 104a are formed with holding parts at the sides along the radial direction. As shown in FIGS. 10 and 11, the slots 104a are narrowest at the most outer periphery and get wider toward radially inside. With these holding parts, The slots 104a prevent the permanent magnets 105 disposed therein from being moved radially outward by centrifugal force. The width of a slot 104 at the most outer periphery is set as about half as the distance between two adjacent slots 104a on the outer periphery of the annular core 104.

Figure 12:
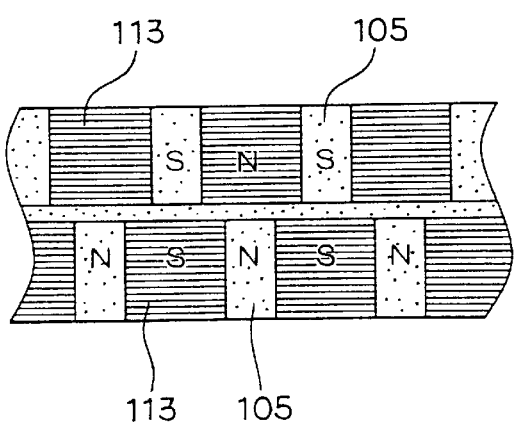
FIG. 12 is an exploded view of the outer periphery of the rotor shown in FIG. 9.

The permanent magnets 105 are magnetized radially so that they have the same magnetic polarities as the annular core 104 disposed in the same axial direction. That is, as shown in FIG. 12, the permanent magnets 105 disposed in the same axial direction as the annular core 104 disposed radially outside one cylindrical part 113 of north pole are magnetized so that the radially outer sides thereof are north poles and the radially inner sides thereof are south poles. Likewise, the permanent magnets 105 disposed in the same axial direction as the annular core 104 disposed radially outside the other cylindrical part 113 of south pole are magnetized so that the radially outer sides thereof are south poles and the radially inner sides thereof are north poles.

In this embodiment, the rotor 120 is also disposed with the permanent magnet 106 which is held by the neutral polar yoke ring 107 radially inside the cylindrical parts 113 of the rotor cores 101. The permanent magnet 106 is magnetized radially in a direction to increase magnetic flux which is led from the cylindrical parts 113 connecting with the magnet 106 to the annular cores 104.

Thus, the rotor 120 in this embodiment prevents the leakage of flux from respective parts and increases flux itself with disposing the permanent magnets 105 and 106 around the cylindrical parts 113 and the annular cores 104, and thus, attains high efficiency.

In addition, the annular cores 104 and the permanent magnets 105 prevent developments of eddy currents at the surfaces thereof, and thus, loss of magnetic flux is further reduced.

Moreover, quantity of the magnetic field winding 3 is reduced in proportion to quantity of installed magnets 105 and a diameter of the boss 11 is enlarged, and therefore performance of the generator is improved.

Again, the volume and quantity of magnets 105 are able to be increased since the holding parts of the slots 104a in the annular cores 104 prevent the magnets 105 from jumping out by centrifugal forces. Therefore, performance of the generator is improved.

Fifth Embodiment

In the fifth embodiment shown in FIGS. 13 to 16, permanent magnets are press-fit in accommodation recesses formed inside a pair of annular cores made of a stack of core sheets.

Figure 13:
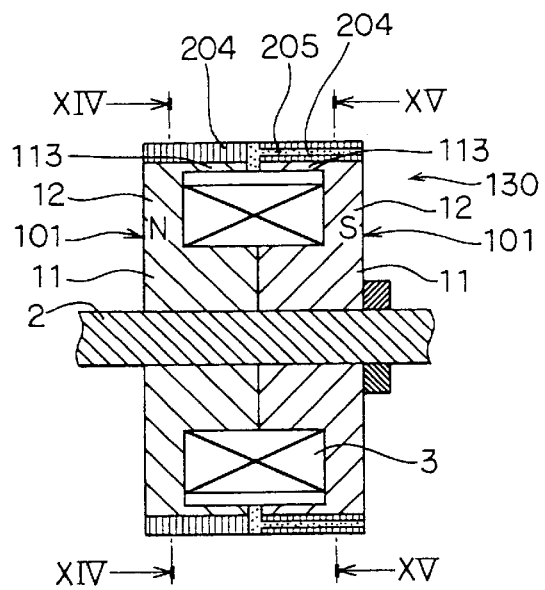
FIG. 13 is a sectional view of a part of an alternating current generator for a vehicle according to the fifth embodiment of the present invention, showing a rotor thereof.
Figure 14:
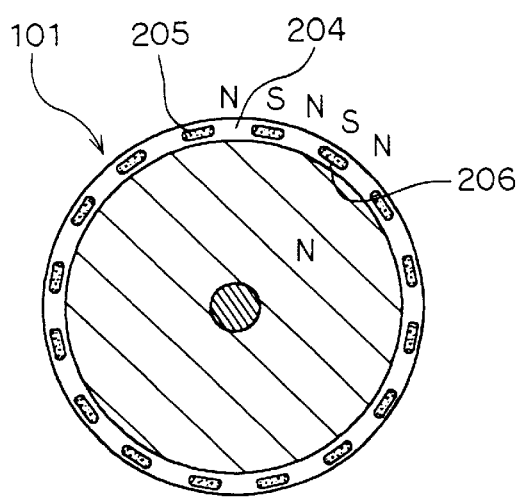
FIG. 14 is a cross-sectional view of the rotor of FIG. 13 as taken along the line XIV—XIV.

A rotor 130 in this embodiment, as shown in FIG. 13, comprises a pair of rotor cores 101, the rotor shaft 2, the magnetic field winding 3, a pair of annular cores 204 made of a stack of core sheets, permanent magnets 205 and the like. In this embodiment, basically the same constructions as the rotors 100, 100A and 120 in the first, second and fourth embodiments are marked likewise.

The annular core 204 is formed with a plurality of accommodations 206 for holding magnets in the circumferential direction at an interval in which an electric angle of the multi-phase windings 22 cycles in 2 π. The accommodations pass through the annular core 204 in the axial direction. The accommodations 206 formed in the annular cores 204 connected to one rotor core 101 and the accommodations 206 formed in the annular core 204 connected to the other rotor core 101 are formed in respective points deviated from each other by electrical angle π in the circumferential direction.

Figure 15:
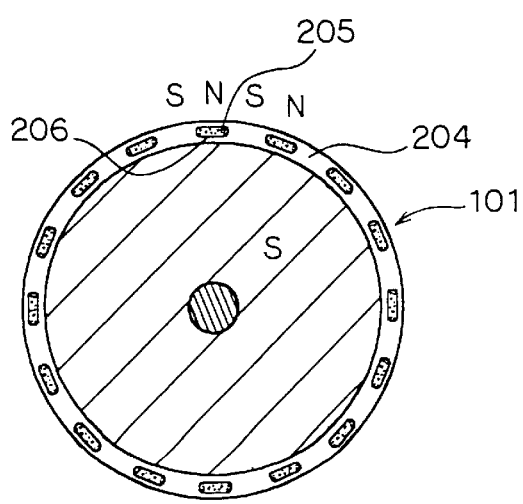
FIG. 15 is a cross-sectional view of the rotor of FIG. 13 as taken along the line XV—XV.
Figure 16:
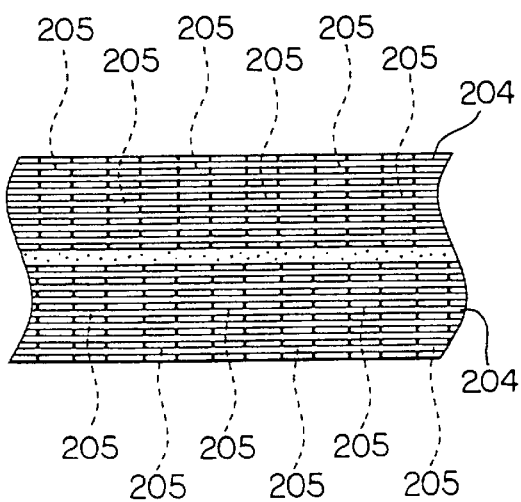
FIG. 16 is an exploded view of the outer periphery of the rotor shown in FIG. 13.

The permanent magnets 205 are press-fit in the respective accommodations 206 formed in the annular cores 204. The permanent magnets 205 are magnetized in the radial direction so that radially outer sides thereof are in the same magnetic polarities as the cylindrical parts 113 of the rotor core 101 disposed inside the magnets 205. That is, as shown in FIG. 15, the permanent magnets 205 press-fit in the accommodations 206 formed in the annular core 204 disposed outside the cylindrical part 113 of one rotor core 101 magnetized into south pole are magnetized so that the radially outer sides thereof are south poles and the radially inner sides are north poles. On the other hand, the permanent magnets 205 press-fit in the accommodations 206 formed in the annular core 204 disposed outside the cylindrical part 113 of the other rotor core 101 magnetized into north pole are magnetized so that the radially outer sides thereof are north poles and the radially inner sides are south poles.

Thus, by adopting interior permanent magnet (IPM) structure, the annular core 204 and the permanent magnets 205 are handled as a solid integrated part, which features easy assembly.

In addition, as to magnetic flux, this structure acquires as high ampere-turn as Lundell-type structure, and layered structures inhibit development of eddy currents on the surfaces of magnetic poles. As a result, a prominently high efficient rotary electric machine is embodied.

Moreover, a diameter of the boss 11 is enlarged since the cylindrical parts 113 and the annular cores 204 are used as magnetic poles instead of the claw-shaped magnetic poles. Therefore, performance of the power generator is improved.

The present invention should not be limited to the disclosed embodiments, but may be implemented in many other ways without departing from the spirit of the invention.

In the above embodiments, rotary electric machine in alternating current generators for vehicles are disclosed. In addition, the embodiments are also applied to rotary electric machine in motors for vehicles likewise because the motors have the same structures basically as the alternating current generators for the vehicles. The motors applied with the same embodiments also enjoy effects of improvement of torque by increase of output and lowering of magnetic flux loss.

What is claimed is:

1. A rotary electric machine, comprising:

a stator having an annular stator core which is wound with multi-phase windings; and a rotor disposed radially inside the stator core to generate magnetic fields, wherein the rotor has a rotor shaft, a pair of rotor cores, each rotor core having a cylindrical boss, wherein the cylindrical boss is press-fit around the rotor shaft, a disc portion extending from an outer periphery of the cylindrical boss in a radial direction, a cylindrical part disposed in an axial direction connecting with the disc portion radially outside the cylindrical boss, the cylindrical part having a wall continuing in a circumferential direction, and a magnetic field winding disposed between the cylindrical boss and the cylindrical part, and an outer periphery of the wall of the cylindrical part is formed to give cyclic changes of magneto-resistance corresponding to a cycle of an electric angle 2 π of the multi-phase windings.

2. A rotary electric machine as in claim 1, further comprising:

an annular core made of a stack of core sheets disposed on the outer periphery of the cylindrical parts, wherein a plurality of projections and recesses are formed alternately in the circumferential direction in either or both of the outer periphery of the cylindrical parts and an inner periphery of the annular core.

3. A rotary electric machine as in claim 1, wherein:

the cylindrical parts have a plurality of projections and recesses formed in the outer periphery thereof alternately in the circumferential direction;

permanent magnets magnetized radially are press-fit in the recesses; and the projections and the permanent magnets constitute pairs of north and south poles in the circumferential direction on the outer periphery of the cylindrical parts.

4. A rotary electric machine as in claim 3, further comprising:

an annular core made of a stack of core sheets disposed on the outer periphery of the cylindrical parts, wherein the annular core is formed with a plurality of magnetic polar regions at an interval of circumferential distance between the projections and the recesses which face each other radially inside the annular core, wherein north and south poles are formed alternately at a plurality of the magnetic polar regions by provision of magnetic flux from the cylindrical parts, and wherein the stator core is provided with altering magnetic flux from the annular core.

5. A rotary electric machine as in claim 2, wherein:

the annular core has a plurality of slits disposed radially at boundaries of the projections and the recesses at an interval corresponding to an electric angle π of the multi-phase windings.

6. A rotary electric machine as in claim 1, further comprising:

a pair of annular cores made of a stack of core sheets disposed on the outer periphery of the cylindrical parts, the annular cores being formed with a plurality of slots in a circumferential direction with openings in radially outer sides thereof and permanent magnets magnetized radially and disposed in the slots, wherein outer periphery of the annular cores are formed with alternating north and south magnetic poles in the circumferential direction.

7. A rotary electric machine as in claim 6, further comprising holding parts for preventing radial movements of the permanent magnets disposed in the slots.

8. A rotary electric machine as in claim 1, further comprising:

a pair of annular cores made of a stack of core sheets disposed on the outer periphery of the cylindrical parts; and permanent magnets, wherein the annular cores have a plurality of accommodations formed radially and disposed circumferentially for holding the permanent magnets, the permanent magnets are placed in the accommodations so that magnetic polarities thereof are in the radial direction, and outer periphery of the annular cores are formed with alternating north and south magnetic poles circumferentially.

9. A rotary electric machine as in claim 8, wherein:

the accommodations formed in the annular core disposed on the outer periphery of one rotor core and the accommodations formed in the annular core disposed on the outer periphery of the other rotor core are formed in respective points deviated from each other circumferentially by electrical angle $\pi$.

* * * * *